(12) United States Patent
Petrakivskyi et al.

(10) Patent No.: US 11,316,350 B2
(45) Date of Patent: Apr. 26, 2022

(54) BATTERY MANAGEMENT APPARATUS AND OPERATING METHOD THEREOF, AND BATTERY MANAGEMENT SYSTEM

(71) Applicant: Samsung Electronics Co., Ltd., Suwon-si (KR)

(72) Inventors: Oleg Petrakivskyi, Zhytomyr (UA); Oleksandr Baiev, Zaporizhzhia (UA); Serhiy Khomych, Lviv (UA); Alina Vitiuk, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 16/789,604

(22) Filed: Feb. 13, 2020

(65) Prior Publication Data

US 2021/0075236 A1    Mar. 11, 2021

(30) Foreign Application Priority Data

Sep. 11, 2019  (KR) .......................... 10-2019-0112683

(51) Int. Cl.
*H02J 7/00* (2006.01)
*H01M 10/42* (2006.01)

(52) U.S. Cl.
CPC ....... *H02J 7/00036* (2020.01); *H01M 10/425* (2013.01); *H01M 10/4207* (2013.01); *H02J 7/0014* (2013.01); *H02J 7/0047* (2013.01); *H01M 2010/4271* (2013.01); *H01M 2010/4278* (2013.01)

(58) Field of Classification Search
USPC ......................................................... 320/128
See application file for complete search history.

(56) References Cited

U.S. PATENT DOCUMENTS

| | | | |
|---|---|---|---|
| 9,436,261 B2 | 9/2016 | Yun | |
| 9,981,559 B2 | 5/2018 | Honda et al. | |
| 2010/0327766 A1* | 12/2010 | Recker | H02J 7/00308 315/291 |
| 2012/0262093 A1* | 10/2012 | Recker | H02J 7/0068 315/308 |
| 2014/0225620 A1* | 8/2014 | Campbell | B60L 53/66 324/426 |
| 2015/0244191 A1 | 8/2015 | Matsumura et al. | |
| 2017/0223807 A1* | 8/2017 | Recker | H02J 13/00006 |
| 2021/0075236 A1* | 3/2021 | Petrakivskyi | H02J 13/00022 |

FOREIGN PATENT DOCUMENTS

| | | |
|---|---|---|
| JP | 5677171 B2 | 2/2015 |
| KR | 10-1572503 B1 | 12/2015 |
| KR | 10-2017-0044874 A | 4/2017 |
| KR | 10-1854876 B1 | 6/2018 |
| WO | WO 2018/088854 A1 | 5/2018 |

* cited by examiner

Primary Examiner — Mohammed Alam
(74) Attorney, Agent, or Firm — NSIP Law

(57) ABSTRACT

A battery management apparatus includes: a first transceiver configured to receive a first infrared (IR) signal output from a neighbor battery management apparatus and process the first IR signal; a controller configured to extract information from the processed first IR signal; and a second transceiver configured to output a second IR signal based on the extracted information.

18 Claims, 12 Drawing Sheets

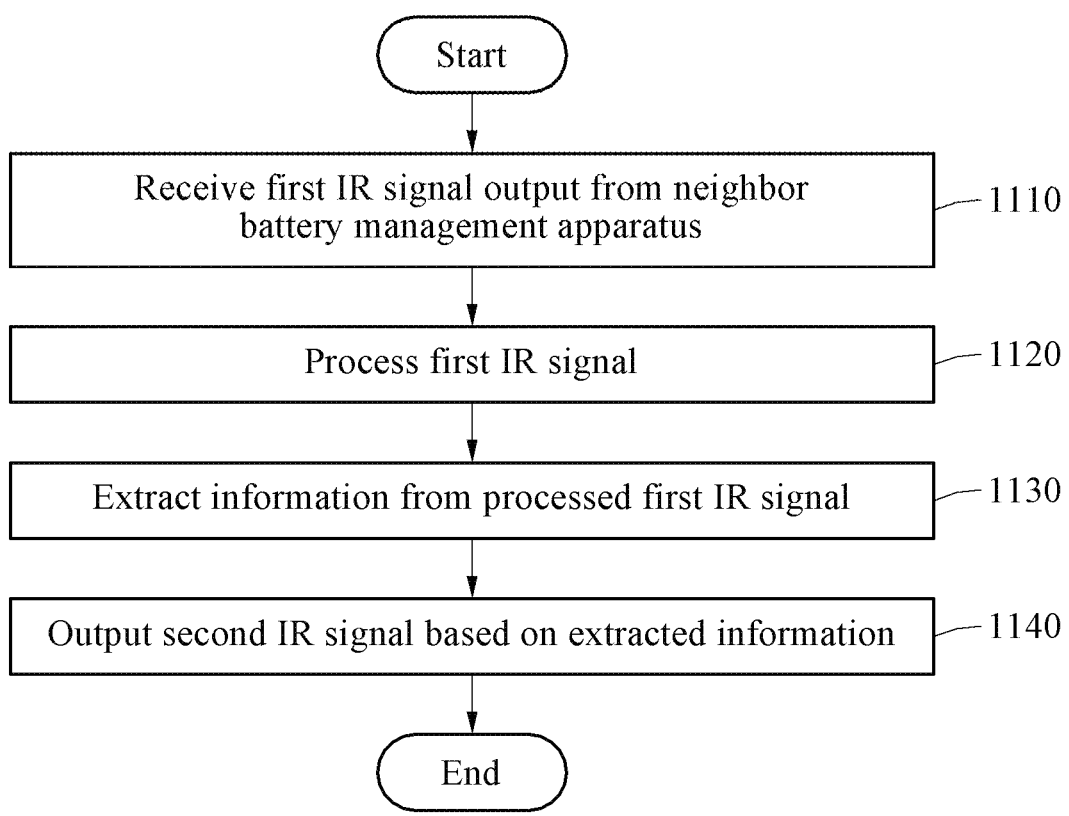

BATTERY MANAGEMENT APPARATUS AND OPERATING METHOD THEREOF, AND BATTERY MANAGEMENT SYSTEM

CROSS-REFERENCE TO RELATED APPLICATIONS

This application claims the benefit under 35 USC § 119(a) of Korean Patent Application No. 10-2019-0112683 filed on Sep. 11, 2019 in the Korean Intellectual Property Office, the entire disclosure of which is incorporated herein by reference for all purposes.

BACKGROUND

1. Field

The following description relates to a battery management apparatus and system.

2. Description of Related Art

A plurality of battery cells may be included in a single battery pack. A plurality of battery packs may operate as batteries that provide power to a single device, for example, an electric vehicle. A battery management system may monitor states of the plurality of battery cells to efficiently manage the plurality of battery cells.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery management apparatus includes: a first transceiver configured to receive a first infrared (IR) signal output from a neighbor battery management apparatus and process the first IR signal; a controller configured to extract information from the processed first IR signal; and a second transceiver configured to output a second IR signal based on the extracted information.

The controller may be further configured to change a state of the first transceiver to a transmission state, in response to the first transceiver receiving the first IR signal.

The first transceiver may be further configured to transmit, in the transmission state, a response to the first IR signal to the neighbor battery management apparatus.

The controller may be further configured to change a state of the second transceiver to a reception state, in response to the second transceiver outputting the second IR signal.

The controller may be further configured to perform an operation based on the extracted information, and transmit a result of the operation to the neighbor battery management apparatus through the first transceiver.

The controller may be further configured to transmit a result of an operation of another neighbor battery management apparatus to the neighbor battery management apparatus through the first transceiver, in response to the second transceiver receiving the result of the operation from the other neighbor battery management apparatus.

The first transceiver may be further configured to generate an electrical signal by receiving the first IR signal, amplify the electrical signal, filter the amplified electrical signal, compare a result of the filtering to a reference electrical signal, and output a result of the comparing to the controller.

The second transceiver may be further configured to output the second IR signal by receiving the extracted information from the controller and modulating the extracted information based on a carrier signal.

The first transceiver and the second transceiver may each include: an IR light emitting diode (LED) configured to perform light emitting and light receiving; an amplifier configured to amplify an electrical signal generated when the IR LED performs the light receiving; a filter configured to filter an output signal of the amplifier; a comparator configured to compare an output signal of the filter to a reference signal and output a result of the comparing to the controller; a modulator configured to receive information from the controller and modulate the received information; and a switch configured to switch between the IR LED and the modulator based on a control of the controller.

In another general aspect, a battery management system includes: slave battery management apparatuses; and a master battery management apparatus configured to control the slave battery management apparatuses, wherein the slave battery management apparatuses each include: a first transceiver configured to receive a first infrared (IR) signal output from a neighbor battery management apparatus, among the slave battery management apparatuses, and process the first IR signal; a controller configured to extract information from the processed first IR signal; and a second transceiver configured to output a second IR signal based on the extracted information.

The controller may be further configured to change a state of the first transceiver to a transmission state, in response to the first transceiver receiving the first IR signal.

The first transceiver may be further configured to transmit, in the transmission state, a response to the first IR signal to the neighbor battery management apparatus.

The controller may be further configured to change a state of the second transceiver to a reception state, in response to the second transceiver outputting the second IR signal.

The controller may be further configured to perform an operation based on the extracted information, and transmit a result of the operation to the neighbor battery management apparatus through the first transceiver.

The controller may be further configured to transmit a result of an operation of another neighbor battery management apparatus to the neighbor battery management apparatus through the first transceiver, in response to the second transceiver receiving the result of the operation from the other neighbor battery management apparatus.

The first transceiver may be further configured to generate an electrical signal by receiving the first IR signal, amplify the electrical signal, filter the amplified electrical signal, compare a result of the filtering to a reference electrical signal, and output a result of the comparing to the controller.

The second transceiver may be further configured to output the second IR signal by receiving the extracted information from the controller and modulating the extracted information based on a carrier signal.

The first transceiver and the second transceiver may each include: an IR light emitting diode (LED) configured to perform light emitting and light receiving; an amplifier configured to amplify an electrical signal generated when the IR LED performs the light receiving; a filter configured to filter an output signal of the amplifier; a comparator configured to compare an output signal of the filter to a reference signal and output a result of the comparing to the controller; a modulator configured to receive information from the controller and modulate the received information; and a switch configured to switch between the IR LED and the modulator based on a control of the controller.

In another general aspect, an operating method of a battery management apparatus includes: receiving a first infrared (IR) signal output from a neighbor battery management apparatus; processing the first IR signal; extracting information from the processed first IR signal; and outputting a second IR signal based on the extracted information.

The operating method may further include transmitting a response to the first IR signal to the neighbor battery management apparatus.

Other features and aspects will be apparent from the following detailed description, the drawings, and the claims.

BRIEF DESCRIPTION OF THE DRAWINGS

FIG. 11 illustrates an example of an operating method of a battery management apparatus.

Figure 1:
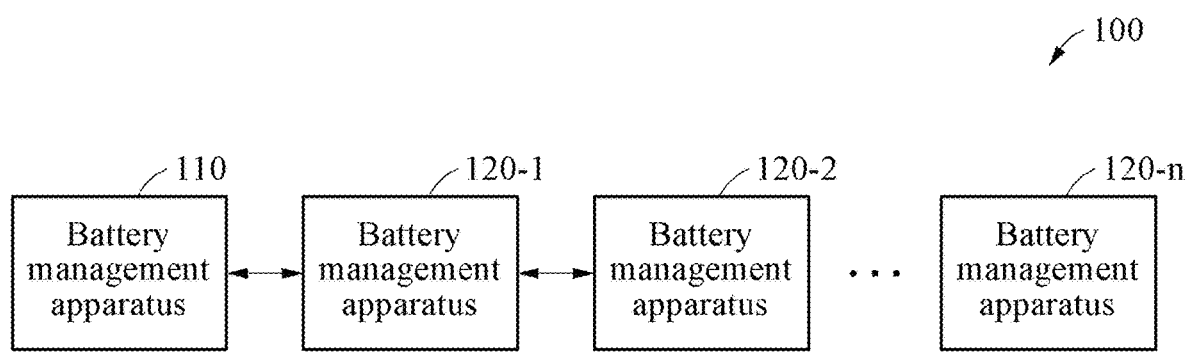
FIGS. 1 through 3 illustrate an example of a battery management system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
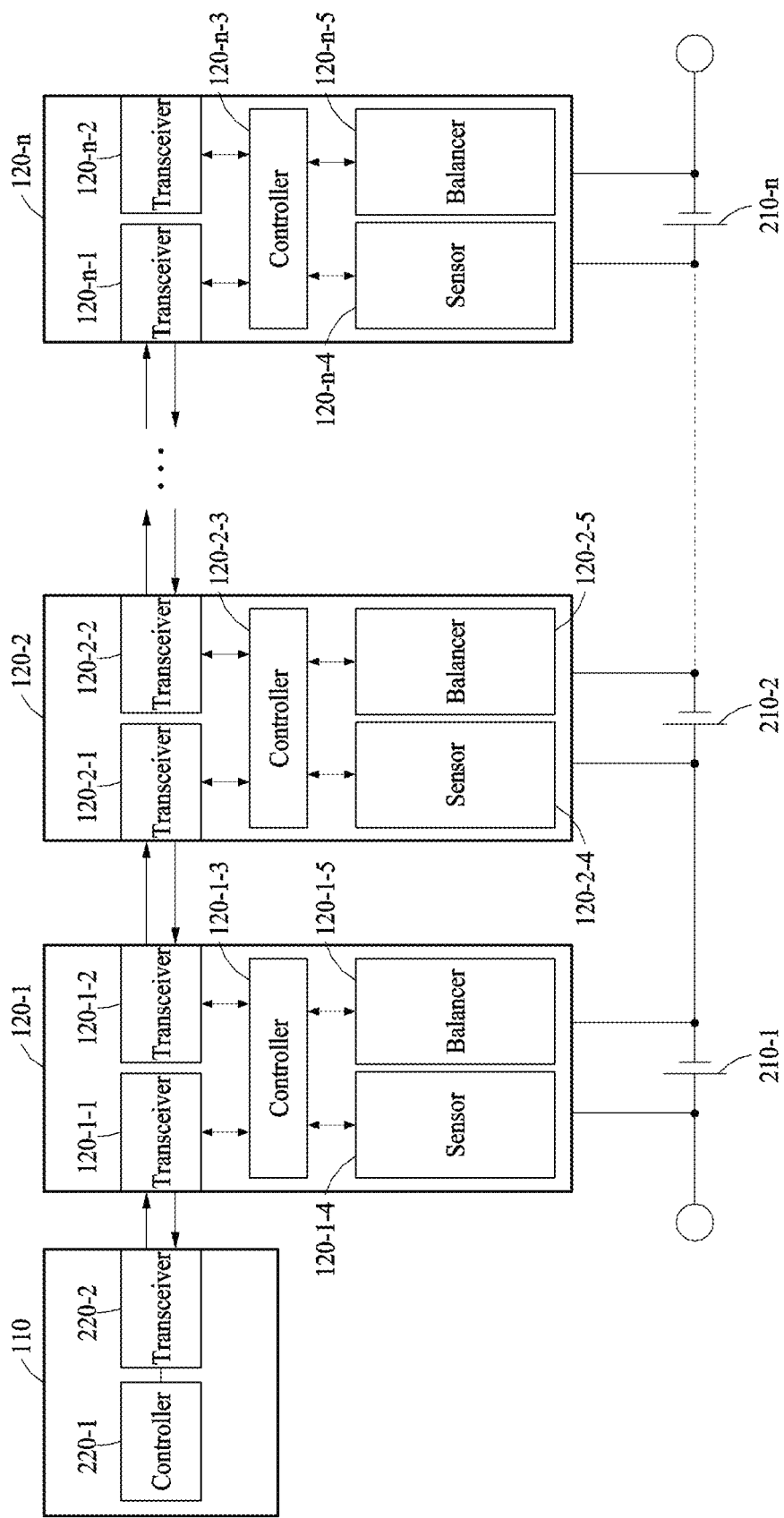
Figure 3:
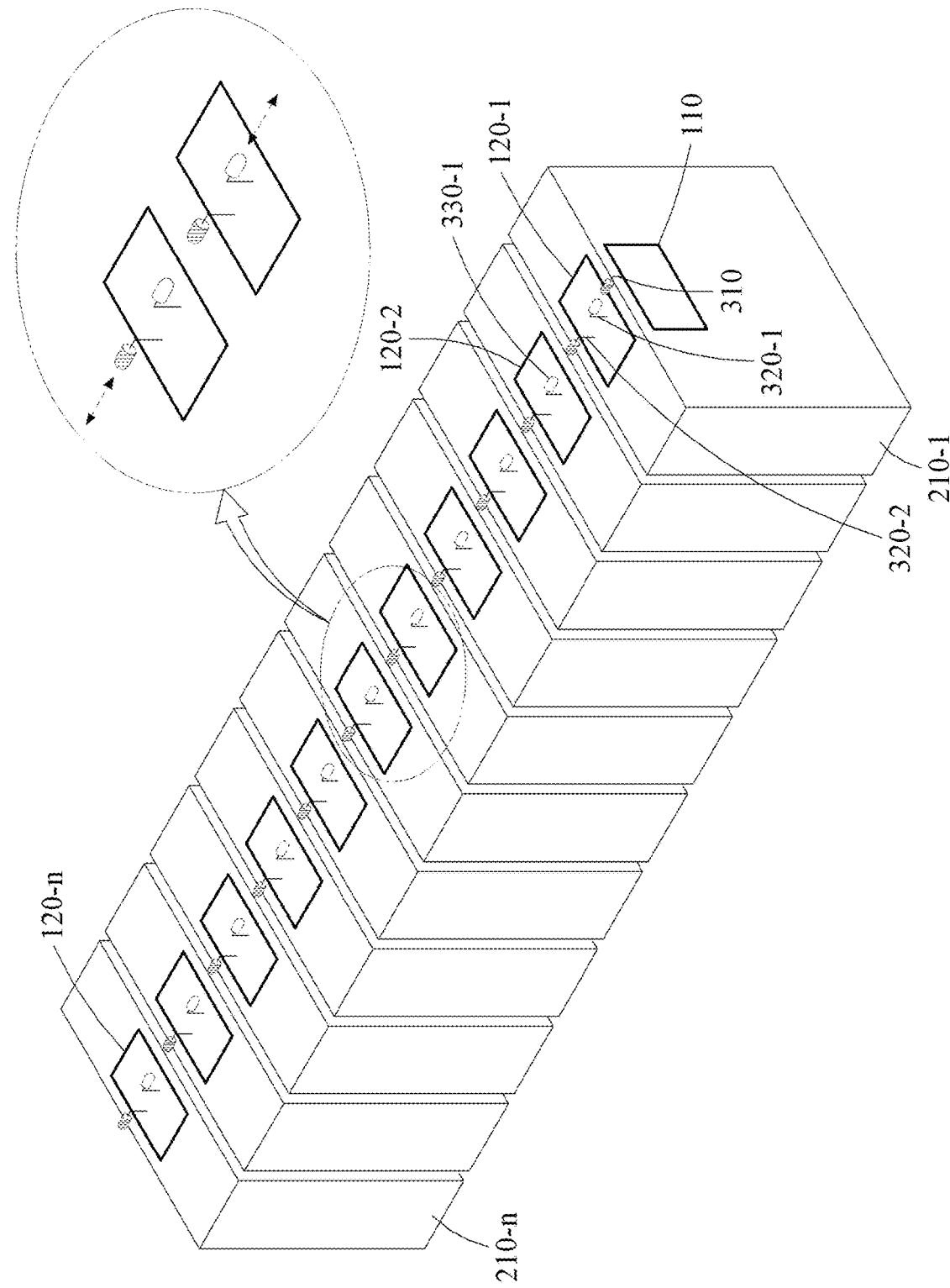

FIGS. 1 through 3 illustrate an example of a battery management system 100.

Referring to FIG. 1, the battery management system 100 includes battery management apparatuses 110 and 120-1 through 120-n.

The battery management apparatus 110 controls the battery management apparatuses 120-1 through 120-n. Hereinafter, the battery management apparatus 110 will be referred to as a master battery management apparatus, and the other battery management apparatuses 120-1 through 120-n will be referred to as slave battery management apparatuses.

The master battery management apparatus 110 performs optical communication with the slave battery management apparatus 120-1. For example, the master battery management apparatus 110 performs half-duplex communication with the slave battery management apparatus 120-1 using infrared (IR) signals.

The slave battery management apparatuses 120-1 through 120-n each perform optical communication with a neighbor slave battery management apparatus. For example, the slave battery management apparatus 120-1 performs half-duplex communication with the slave battery management apparatus 120-2 using IR signals. Although not shown in FIG. 1, the slave battery management apparatus 120-2 may perform half-duplex communication with a slave battery management apparatus neighboring another side of the slave battery management apparatus 120-2 using IR signals. Similarly, although not shown in FIG. 1, the slave battery management apparatus 120-*n* may perform half-duplex communication with a slave battery management apparatus neighboring the slave battery management apparatus 120-*n*.

The battery management system 100 and batteries form a battery pack. Further, the battery management system 100 is applicable to various electronic devices using rechargeable batteries, such as, but not limited to, an electric vehicle, a hybrid vehicle, and an energy storage system.

Hereinafter, the master battery management apparatus 110 and the slave battery management apparatuses 120-1 through 120-*n* will be described further with reference to FIGS. 2 and 3. Throughout the following description, the letter "n" used in conjunction with reference numbers indicates an integer corresponding to a last element/component among a group of similar elements/components, and having a value corresponding to a total number of the similar elements/components.

Referring to FIG. 2, the master battery management apparatus 110 includes a controller 220-1 and a transceiver 220-2.

The controller 220-1 generates a command for controlling each of the slave battery management apparatuses 120-1 through 120-*n*. The command includes, for example, a sensing command and a balancing command. However, the command generated by the controller 220-1 is not limited to the foregoing examples.

The transceiver 220-2 transmits the generated command to the slave battery management apparatus 120-1 through an IR signal. In response to the transceiver 220-2 transmitting the generated command to the slave battery management apparatus 120-1, the controller 220-1 changes a state of the transceiver 220-2 from a transmission state to a reception state.

The slave battery management apparatus 120-1 includes transceivers 120-1-1 and 120-1-2, a controller 120-1-3, a sensor 120-1-4, and a balancer 120-1-5.

The transceiver 120-1-1 receives the IR signal output from the transceiver 220-2, and processes the IR signal. This process will be described with reference to FIG. 6.

In response to the transceiver 120-1-1 completing receiving the IR signal from the master battery management apparatus 110, the controller 120-1-3 changes a state of the transceiver 120-1-1 from a reception state to a transmission state. The transceiver 120-1-1, when in the transmission state, transmits an acknowledgement to the master battery management apparatus 110 through an IR signal.

The controller 120-1-3 extracts the command of the master battery management apparatus 110 from the processed IR signal and operates based on the extracted command. For example, the controller 120-1-3 extracts a sensing command from the processed IR signal. In this example, the extracted sensing command includes a sensing start timepoint. The controller 120-1-3 senses a corresponding battery 210-1 at the sensing start timepoint using the sensor 120-1-4, and stores sensing data generated in response to the sensing in a buffer. In another example, the controller 120-1-3 extracts a balancing command from the processed IR signal, and performs balancing using the balancer 120-1-5.

The controller 120-1-3 transmits the extracted command to the transceiver 120-1-2, and the transceiver 120-1-2 outputs an IR signal based on the extracted command. In response to the transceiver 120-1-2 completing outputting the IR signal, the controller 120-1-3 changes a state of the transceiver 120-1-2 from a transmission state to a reception state.

The slave battery management apparatus 120-2 includes transceivers 120-2-1 and 120-2-2, a controller 120-2-3, a sensor 120-2-4, and a balancer 120-2-5.

The transceiver 120-2-1 receives the IR signal output from the transceiver 120-1-2, and processes the IR signal. In response to the transceiver 120-2-1 completing receiving the IR signal, the controller 120-2-3 changes a state of the transceiver 120-2-1 from a reception state to a transmission state. The transceiver 120-2-1, when in the transmission state, transmits an IR signal corresponding to an acknowledgement to the slave battery management apparatus 120-1.

The controller 120-2-3 extracts the command of the master battery management apparatus 110 from the processed IR signal and operates based on the extracted command. For example, the controller 120-2-3 extracts a sensing command from the processed IR signal. In this example, the extracted sensing command includes a sensing start timepoint. The controller 120-2-3 senses a corresponding battery 210-2 at the sensing start timepoint using the sensor 120-2-4, and stores sensing data generated in response to the sensing in a buffer. In another example, the controller 120-2-3 extracts a balancing command from the processed IR signal, and performs balancing using the balancer 120-2-5.

The controller 120-2-3 transmits the extracted command to the transceiver 120-2-2, and the transceiver 120-2-2 outputs an IR signal based on the extracted command. In response to the transceiver 120-2-2 completing outputting the IR signal, the controller 120-2-3 changes a state of the transceiver 120-2-2 from a transmission state to a reception state.

In this manner, the command of the master battery management apparatus 110 is relayed to a neighbor slave battery management apparatus, hereinafter referred to as the slave A, of the slave battery management apparatus 120-*n*.

The slave battery management apparatus 120-*n* includes transceivers 120-*n*-1 and 120-*n*-2, a controller 120-*n*-3, a sensor 120-*n*-4, and a balancer 120-*n*-5.

The transceiver 120-*n*-1 receives an IR signal output from a transceiver of the slave A, and processes the IR signal. In response to the transceiver 120-*n*-1 completing receiving the IR signal, the controller 120-*n*-3 changes a state of the transceiver 120-*n*-1 from a reception state to a transmission state. The transceiver 120-*n*-1, when in the transmission state, transmits an IR signal corresponding to an acknowledgement to the slave A.

The controller 120-*n*-3 extracts the command of the master battery management apparatus 110 from the processed IR signal and operates based on the extracted command. For example, the controller 120-*n*-3 extracts a sensing command from the processed IR signal. In this example, the extracted sensing command includes a sensing start timepoint. The controller 120-*n*-3 senses a corresponding battery 210-*n* at the sensing start timepoint using the sensor 120-*n*-4, and stores sensing data generated in response to the sensing in a buffer. In another example, the controller 120-*n*-3 extracts a balancing command from the processed IR signal, and performs balancing using the balancer 120-*n*-5.

The controller 120-*n*-3 transmits the extracted command to the transceiver 120-*n*-2, and the transceiver 120-*n*-2 outputs an IR signal based on the extracted command. In response to the transceiver 120-*n*-2 completing outputting the IR signal, the controller 120-*n*-3 changes a state of the transceiver 120-*n*-2 from a transmission state to a reception state.

The controller 120-*n*-3 verifies whether the transceiver 120-*n*-2 in the reception state receives the IR signal corresponding to the acknowledgement within a predetermined time. In response to the transceiver 120-n-2, failing to receive, in the reception state, the IR signal corresponding to the acknowledgement within the predetermined time, the controller 120-n-3 recognizes that the slave battery management apparatus 120-n is the last slave battery management apparatus in a chain. Based on a result of the recognition that the slave battery management apparatus 120-n is the last slave battery management apparatus in the chain, the controller 120-n-3 transmits a result of an operation corresponding to the extracted command to the slave A using the transceiver 120-n-1. For example, the controller 120-n-3 transmits sensing data of a corresponding battery 210-n to the transceiver 120-n-1, and the transceiver 120-n-1 transmits the sensing data of the corresponding battery 210-n to the slave A through an IR signal.

In response to the result of the operation of the slave battery management apparatus 120-n being received, the slave A transmits an IR signal corresponding to an acknowledgement to the slave battery management apparatus 120-n. Further, the slave A transmits the result of the operation of the slave battery management apparatus 120-n to a neighbor slave battery management apparatus, hereinafter, the slave B, of the slave A through an IR signal. In addition, the slave A transmits a result of an operation corresponding to the command of the master battery management apparatus 110, for example, sensing data of the corresponding battery of the slave A, to the slave B through an IR signal. The slave B receives the result of the operation of the slave A and the result of the operation of the slave battery management apparatus 120-n from the slave A. In this manner, the result of the operation of each of the slave battery management apparatuses 120-2 through 120-n is transmitted to the slave battery management apparatus 120-1. That is, the slave battery management apparatus 120-1 collects the result of the operation of each of the slave battery management apparatuses 120-2 through 120-n.

The slave battery management apparatus 120-1 transmits the result of the operation of each of the slave battery management apparatuses 120-2 through 120-n to the master battery management apparatus 110 through an IR signal. Further, the slave battery management apparatus 120-1 transmits a result of its operation to the master battery management apparatus 110 through an IR signal. Accordingly, the master battery management apparatus 110 receives the result of the operation of each of the slave battery management apparatuses 120-1 through 120-n from the slave battery management apparatus 120-1. For example, the master battery management apparatus 110 receives sensing data of each of the batteries 210-1 through 210-n from the slave battery management apparatus 120-1.

The transceivers 220-2, 120-1-1, 120-1-2, 120-2-1, 120-2-2, . . . , 120-n-1, and 120-n-2 each include an IR light emitting diode (LED). As shown in the example of FIG. 3, the transceiver 220-2 of the master battery management apparatus 110 includes an IR LED 310, and the transceiver 120-1-1 of the slave battery management apparatus 120-1 includes an IR LED 320-1. In this example, the IR LED 310 and the IR LED 320-1 face each other. Similarly, the transceiver 120-1-2 of the slave battery management apparatus 120-1 includes an IR LED 320-2, and the transceiver 120-2-1 of the slave battery management apparatus 120-2 includes an IR LED 330-1. In this example, the IR LED 320-2 and the IR LED 330-1 face each other.

As described with reference to FIG. 2, each of the slave battery management apparatuses 120-1 through 120-(n-1) transmits the command of the master battery management apparatus 110 received from a neighbor slave battery management apparatus to another neighbor slave battery management apparatus. In other words, each of the slave battery management apparatuses 120-1 through 120-(n-1) relays the command of the master battery management apparatus 110. Accordingly, the command of the master battery management apparatus 110 is broadcast to the slave battery management apparatuses 120-1 through 120-n.

Further, each of the slave battery management apparatuses 120-2 through 120-n transmits the result of the operation corresponding to the command of the master battery management apparatus 110 to a neighbor slave battery management apparatus. In this example, the slave battery management apparatus 120-1 neighboring the master battery management apparatus 110 collects the result of the operation of each of the slave battery management apparatuses 120-2 through 120-n. The slave battery management apparatus 120-1 transmits the result of the operation of each of the slave battery management apparatuses 120-2 through 120-n and the result of the operation of the slave battery management apparatus 120-1 to the master battery management apparatus 110.

Figure 4A:
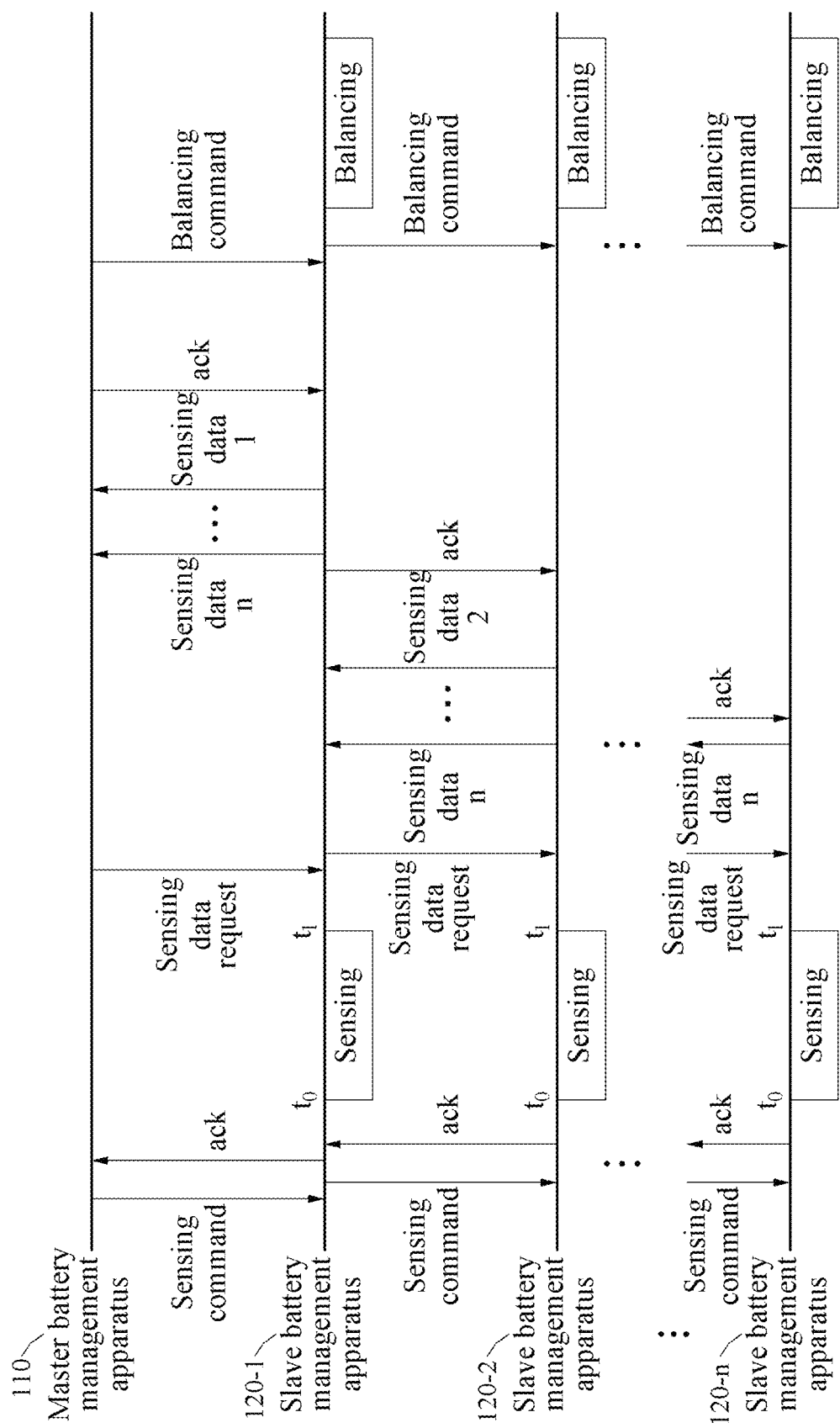
FIGS. 4A and 4B illustrate an example of communication of a battery management system.
Figure 4B:
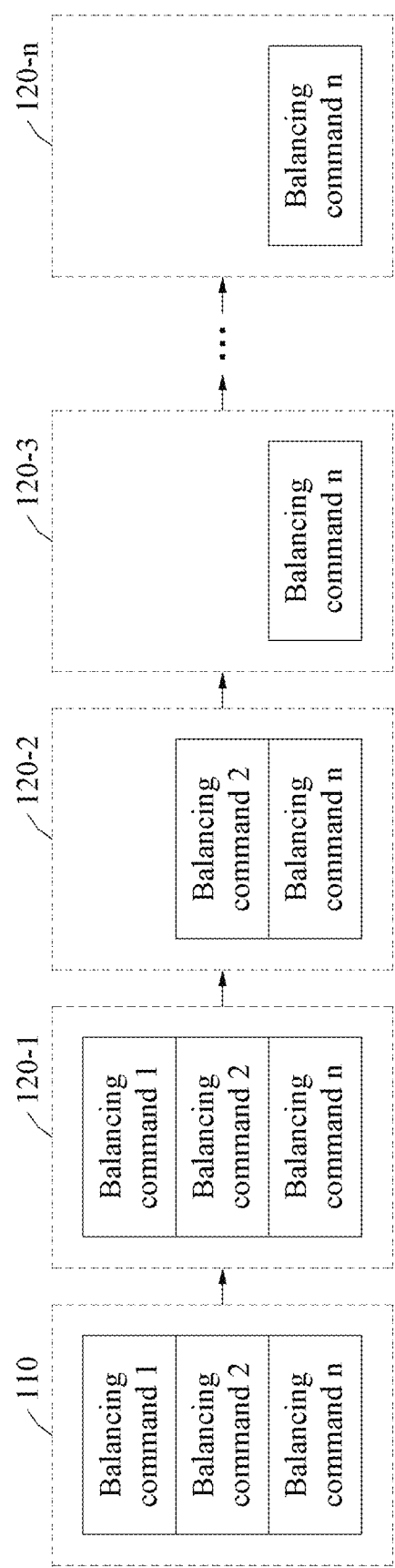

FIGS. 4A and 4B illustrate an example of communication of a battery management system.

Referring to FIG. 4A, the master battery management apparatus 110 transmits an IR signal corresponding to a sensing command to the slave battery management apparatus 120-1. In this example, the sensing command includes a synchronization timepoint or a sensing start timepoint.

The slave battery management apparatus 120-1 transmits an IR signal corresponding to an acknowledgement to the master battery management apparatus 110.

Each of the slave battery management apparatuses 120-1 through 120-(n-1) relays the sensing command of the master battery management apparatus 110 to a neighbor slave battery management apparatus, as described with reference to FIG. 2. Thus, the sensing command of the master management apparatus 110 is transmitted to the last slave battery management apparatus 120-n.

At a time t0, each of the slave battery management apparatuses 120-1 through 120-n senses a corresponding battery and stores the sensing data in its buffer.

The master battery management apparatus 110 transmits an IR signal corresponding to a sensing data request to the slave battery management apparatus 120-1.

Each of the slave battery management apparatuses 120-1 through 120-(n-1) relays the sensing data request of the master battery management apparatus 110 to a neighbor slave battery management apparatus. Thus, the sensing data request of the master battery management apparatus 110 is transmitted to the last slave battery management apparatus 120-n.

Each of the slave battery management apparatuses 120-2 through 120-n transmits its sensing data to the neighbor slave battery management apparatus transmitting the sensing data request of the master battery management apparatus 110. For example, the slave battery management apparatus 120-2 transmits its sensing data, hereinafter, referred to as the sensing data 2, to the slave battery management apparatus 120-1 transmitting the sensing data request of the master battery management apparatus 110.

Further, each of the slave battery management apparatuses 120-2 through 120-(n-1) transmits the sensing data received from another neighbor slave battery management apparatus to the neighbor slave battery management apparatus transmitting the sensing data request of the master battery management apparatus 110. For example, the slave battery management apparatus 120-2 receives sensing data 3 to n from another neighbor slave battery management apparatus of the slave battery management apparatus 120-2, and transmits the sensing data 3 to n to the slave battery management apparatus 120-1. Here, the sensing data 3 to n correspond to sensing data of the other slave battery management apparatuses, excluding the slave battery management apparatuses 120-1 and 120-2.

The slave battery management apparatus 120-1 transmits the sensing data 2 to n to the master battery management apparatus 110. Further, the slave battery management apparatus 120-1 transmits its sensing data, hereinafter, referred to as the sensing data 1, to the master battery management apparatus 110.

The sensing data may include voltage data and/or temperature data. In this example, the voltage data are, for example, 16-bit data, and the temperature data are, for example, 16-bit data. However, the sensing data is not limited to the foregoing examples.

The master battery management apparatus 110 receives the sensing data 1 through n from the slave battery management apparatus 120-1 and transmits an acknowledgement to the slave battery management apparatus 120-1.

The master battery management apparatus 110 determines state information of the batteries 210-1 through 210-$n$ based on the sensing data 1 to n, respectively. The state information includes, for example, states of charge (SOCs) and/or states of health (SOHs).

The master battery management apparatus 110 determines whether the batteries 210-1 through 210-$n$ are in a balancing state based on the state information of the batteries 210-1 through 210-$n$, and controls a slave battery management apparatus of a battery not in the balancing state to perform balancing.

For example, when a deviation of the SOCs of the corresponding batteries of the slave battery management apparatuses 120-1, 120-2, and 120-$n$ is greater than a reference value, the master battery management apparatus 110 determines that the corresponding batteries of the slave battery management apparatuses 120-1, 120-2, and 120-$n$ are not in the balancing state.

The master battery management apparatus 110 transmits an IR signal corresponding to a balancing command to the slave battery management apparatus 120-1. In this example, as shown in FIG. 4B, the balancing command of the master battery management apparatus 110 includes balancing commands for the slave battery management apparatuses 120-1, 120-2, and 120-$n$, and does not include balancing commands for the other slave battery management apparatuses.

The slave battery management apparatus 120-1 extracts its balancing command, that is, the balancing command 1, by processing the IR signal. Thus, the slave battery management apparatus 120-1 performs balancing using the balancer 120-1-5.

The slave battery management apparatus 120-1 transmits the balancing commands 2 and n remaining after extracting the balancing command 1 to the slave battery management apparatus 120-2 through an IR signal. The slave battery management apparatus 120-2 extracts its balancing command, that is, the balancing command 2, by processing the IR signal output from the slave battery management apparatus 120-1. Thus, the slave battery management apparatus 120-2 performs balancing using the balancer 120-2-5.

The slave battery management apparatus 120-2 transmits the balancing command n remaining after extracting the balancing command 2 to the slave battery management apparatus 120-3 through an IR signal.

However, the slave battery management apparatus 120-3 may not find its balancing command even when processing the IR signal output from the slave battery management apparatus 120-2. Thus, the slave battery management apparatus 120-3 transmits the balancing command n to a neighbor battery management apparatus through an IR signal, without performing balancing.

The balancing command n is relayed. In this example, a slave battery management apparatus relaying the balancing command n does not perform balancing. A neighbor slave battery management apparatus of the slave battery management apparatus 120-$n$ receives the balancing command n and transmits the balancing command n to the slave battery management apparatus 120-$n$.

The slave battery management apparatus 120-$n$ performs balancing using the balancer 120-$n$-5 in accordance with the balancing command n.

Figure 5:
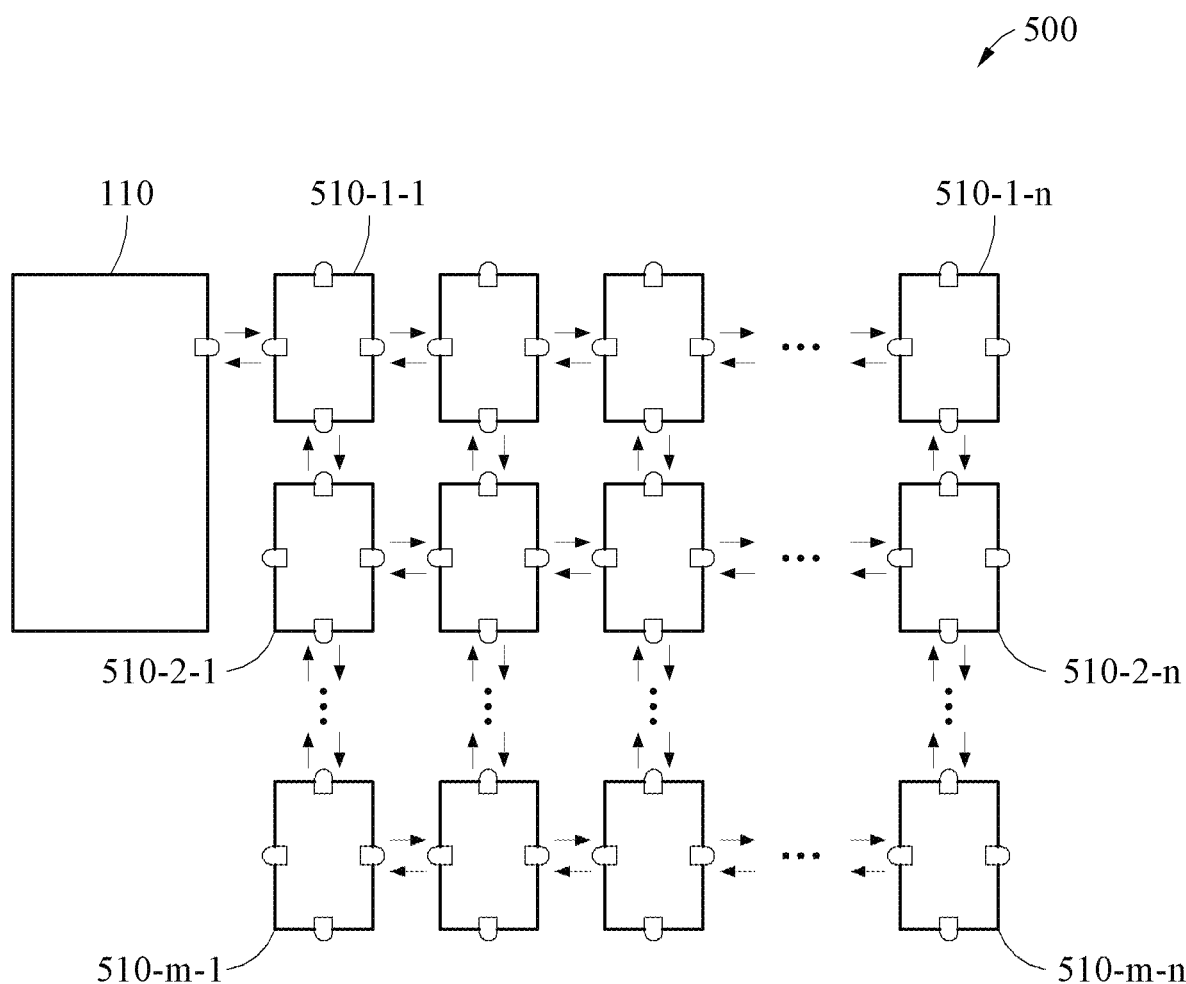
FIG. 5 illustrates an example of a battery management system.

FIG. 5 illustrates an example of a battery management system 500.

Referring to FIG. 5, the battery management system 500 includes the master battery management apparatus 110 and a plurality of slave battery management apparatuses 510-1-1 through 510-$m$-$n$.

The description of the slave battery management apparatuses 120-1 through 120-$n$ also applies to the slave battery management apparatuses 510-1-1 through 510-$m$-$n$, and thus a detailed description of the slave battery management apparatuses 510-1-1 through 510-$m$-$n$ will be omitted for conciseness.

In the example of FIG. 5, the slave battery management apparatuses 510-1-1 through 510-$m$-$n$ are arranged in the form of a matrix. Unlike the examples of FIGS. 2 and 3, transceivers are disposed on all sides of each of the slave battery management apparatuses 510-1-1 through 510-$m$-$n$, such that the slave battery management apparatuses 510-1-1 through 510-$m$-$n$ perform IR communication in many directions. Thus, the slave battery management apparatuses 510-1-1 through 510-$m$-$n$ are applicable to various arrangements of batteries, without changing the structure. That is, the slave battery management apparatuses 510-1-1 through 510-$m$-$n$ are applicable to various configurations of battery cells without changing the structure.

FIGS. 6 through 9B illustrate examples of a transceiver.

The transceivers 220-2, 120-1-1, 120-1-2, 120-2-1, 120-2-2, 120-$n$-1, and 120-$n$-2 described through FIGS. 1 through 5 each include an IR LED, an amplifier, a filter, a comparator, a modulator, and a switch. Examples of the transceivers 220-2, 120-1-1, 120-1-2, 120-2-1, 120-2-2, 120-$n$-1, and 120-$n$-2 will be described with reference to FIG. 6.

Figure 6:
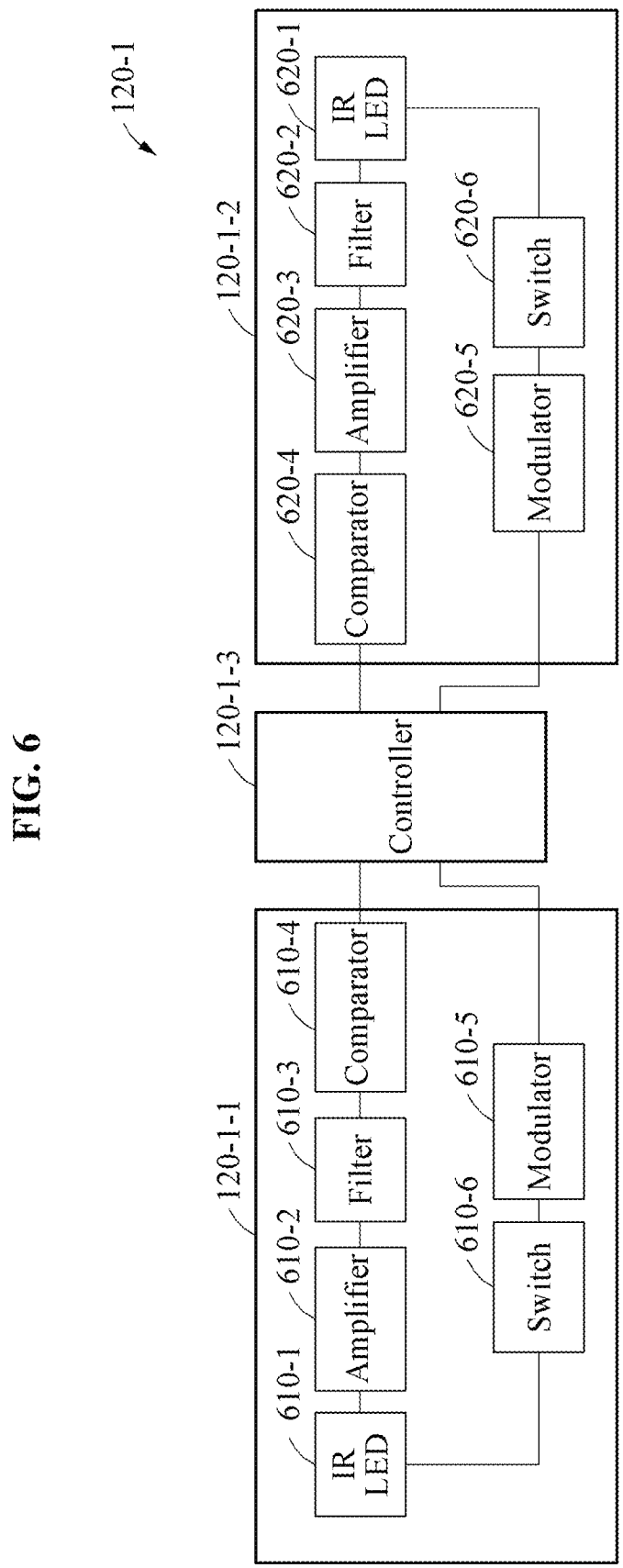
FIGS. 6 through 9B illustrate examples of transceivers.

Referring to FIG. 6, the transceiver 120-1-1 includes an IR LED 610-1, an amplifier 610-2, a filter 610-3, a comparator 610-4, a modulator 610-5, and a switch 610-6, and the transceiver 120-1-2 includes an IR LED 620-1, a filter 620-2, an amplifier 620-3, a comparator 620-4, a modulator 620-5, and a switch 620-6.

The IR LED 610-1 performs light emitting and light receiving. For example, the IR LED 610-1 emits an IR signal in a transmission state and receives an IR signal in a reception state.

The transceiver 120-1-1 processes the IR signal received through the IR LED 610-1. For example, when an IR signal is detected, the IR LED 610-1 generates an electrical signal, for example, a voltage signal or a current signal, corresponding to the IR signal. The amplifier 610-2 amplifies the corresponding electrical signal. The filter 610-3 filters an output signal of the amplifier 610-2. The comparator 610-4 compares an output signal of the filter 610-3 to a reference signal.

The IR signal processed by the transceiver 120-1-1, that is, the output signal of the comparator 610-4, is transmitted to the controller 120-1-3.

The controller 120-1-3 identifies the command of the master battery management apparatus 110 in the processed IR signal, and performs an operation based on the identified command. Further, the controller 120-1-3 changes a state of the transceiver 120-1-1 to a transmission state by controlling the switch 610-6. Thus, the IR LED 610-1 is electrically connected to the modulator 610-5.

The controller 120-1-3 transmits the command of the master battery management apparatus 110 to the modulator 620-5 in the transceiver 120-1-2, to relay the command of the master battery management apparatus 110 to the slave battery management apparatus 120-2.

The modulator 620-5 modulates the command received from the controller 120-1-3. For example, the modulator 620-5 modulates the command received from the controller 120-1-3 based on a carrier signal. The frequency of the carrier signal is, for example, 4 megahertz (MHz). However, the carrier signal is not limited to a 4 MHz signal.

The IR LED 620-1 transmits the command modulated by the modulator 620-5 to the slave battery management apparatus 120-2 through an IR signal.

In response to the transceiver 120-1-2 completing outputting the IR signal, the controller 120-1-3 changes a state of the transceiver 120-1-2 to a reception state by controlling the switch 620-6.

The IR LED 620-1 receives an IR signal from the slave battery management apparatus 120-2. The IR signal includes, for example, sensing data of corresponding batteries of the slave battery management apparatuses 120-2 through 120-n.

The IR LED 620-1 converts the IR signal of the slave battery management apparatus 120-2 into an electrical signal, for example, a voltage signal or a current signal. The filter 620-2 filters the corresponding electrical signal. The amplifier 620-3 amplifies an output signal of the filter 620-2. The comparator 620-4 compares an output signal of the amplifier 620-3 to a reference signal. An output signal of the comparator 620-4 is transmitted to the controller 120-1-3.

The controller 120-1-3 changes the state of the transceiver 120-1-2 to a transmission state by controlling the switch 620-6.

The controller 120-1-3 transmits the output signal of the comparator 620-4 to the modulator 610-5 of the transceiver 120-1-1. The modulator 610-5 modulates the signal received from the controller 120-1-3 based on a carrier signal. The IR LED 610-1 outputs the modulated signal to the master battery management apparatus 110 through an IR signal. In other words, the transceiver 120-1-1 transmits the sensing data of the corresponding batteries of the slave battery management apparatuses 120-2 through 120-n to the master battery management apparatus 110 through an IR signal.

The controller 120-1-3 transmits the sensing data of the corresponding battery 210-1 of the slave battery management apparatus 120-1 to the modulator 610-5. The modulator 610-5 modulates the sensing data of the corresponding battery 210-1 based on a carrier signal. The IR LED 610-1 outputs the modulated sensing data to the master battery management apparatus 110 through an IR signal.

In response to the transceiver 120-1-1 completing outputting IR signals corresponding to the sensing data of the batteries 210-1 through 210-n, the controller 120-1-3 changes the state of the transceiver 120-1-1 to a reception state by controlling the switch 610-6.

Transceivers included in the other slave battery management apparatuses 120-2 through 120-n may each include an IR LED, an amplifier, a filter, a comparator, a modulator, and a switch, similar to the transceivers 120-1-1 and 120-1-2 described with reference to FIG. 6. Accordingly, the description of the light receiving, the processing, and the light emitting of the transceivers 120-1-1 and 120-1-2 provided with reference to FIG. 6 also applies to the transceivers included in the other slave battery management apparatuses 120-2 through 120-n.

The transceiver 220-2 of the master battery management apparatus 110 may include an IR LED, an amplifier, a filter, a comparator, a modulator, and a switch, similar to the transceivers 120-1-1 and 120-1-2 described with reference to FIG. 6. Accordingly, the description of the light receiving, the processing, and the light emitting of the transceivers 120-1-1 and 120-1-2 provided with reference to FIG. 6 also applies to the transceiver 220-2 of the master battery management apparatus 110.

Figure 7:
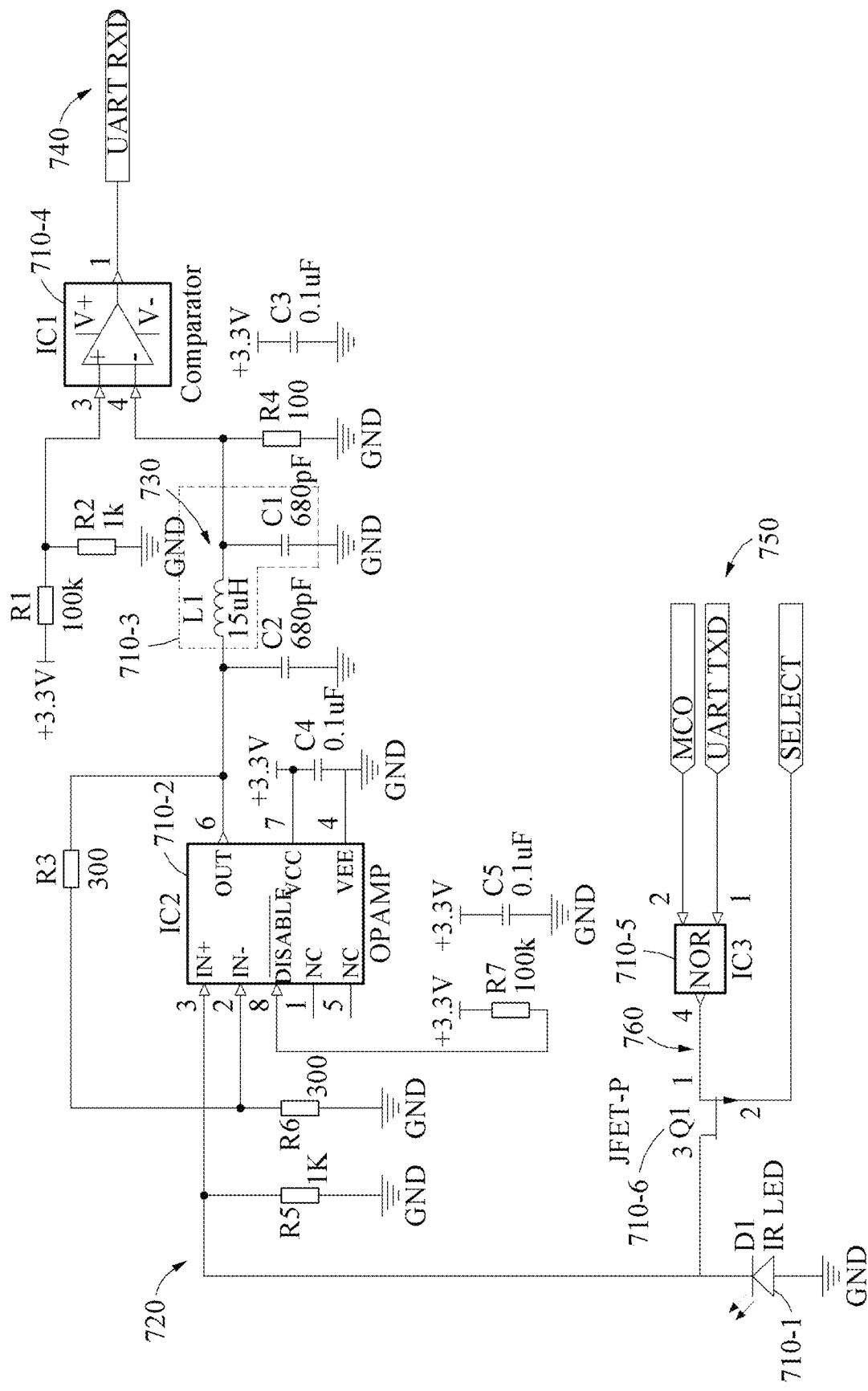

FIG. 7 illustrates an example of a schematic design of the transceiver 120-1-1.

As shown in the example of FIG. 7, an IR LED 710-1, an amplifier 710-2, a filter 710-3, a comparator 710-4, a modulator 710-5, and a switch 710-6 are included in the transceiver 120-1-1. The IR LED 710-1, the amplifier 710-2, the filter 710-3, the comparator 710-4, the modulator 710-5, and the switch 710-6 correspond to the IR LED 610-1, the amplifier 610-2, the filter 610-3, the comparator 610-4, the modulator 610-5, and the switch 610-6 of FIG. 6.

The comparator 710-4 is connected to a reception port 740 of the controller 120-1-3, and a NOR gate of the modulator 710-5 is connected to a micro controller unit (MCU) output (MCO) port and a transmission port of the controller 120-1-3.

The switch 710-6 corresponds to a junction field effect transistor (JFET). However, examples are not limited thereto. The controller 120-1-3 changes a state of the transceiver 120-1-1 to a reception state by setting a SELECT pin to "1", or changes the state of the transceiver 120-1-1 to a transmission state by setting the SELECT pin to "0".

In the reception state, the IR LED 710-1 receives an IR signal and generates an electrical signal. The generated electrical signal is transmitted to the amplifier 710-2 via a node 720.

Figure 8A:
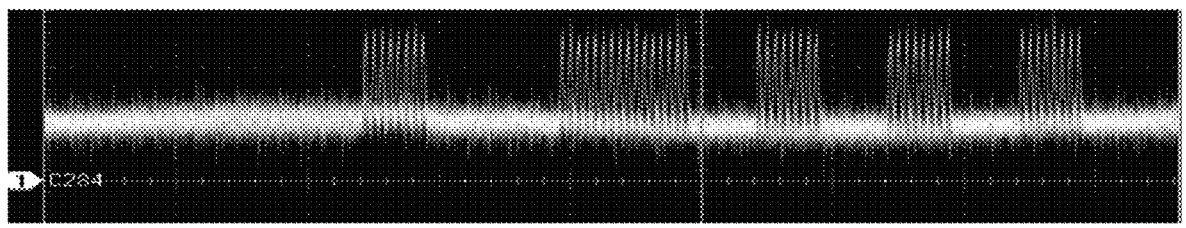

An example of a signal waveform at the node 720 is illustrated in FIG. 8A. In other words, an example of the electrical signal generated by the IR LED 710-1 performing light receiving is illustrated in FIG. 8A.

The filter 710-3 filters an output signal of the amplifier 710-2. The filter 710-3 corresponds to a low-pass filter (LPF) including an inductor and a capacitor. However, the filter 710-3 is not limited to an LPF including an inductor and a capacitor. The filter 710-3 removes noise from the output signal of the amplifier 710-2. An output signal of the filter 710-3 is transmitted to the comparator 710-4 via a node 730.

Figure 8B:
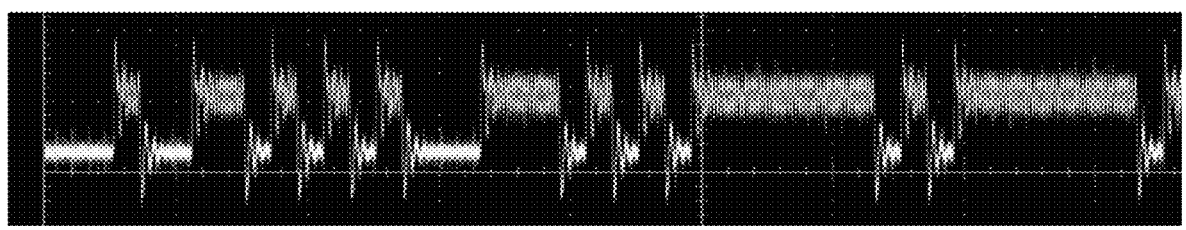

An example of a signal waveform at the node 730 is illustrated in FIG. 8B. In other words, an example of the amplified and filtered electrical signal is illustrated in FIG. 8B.

Figure 8C:
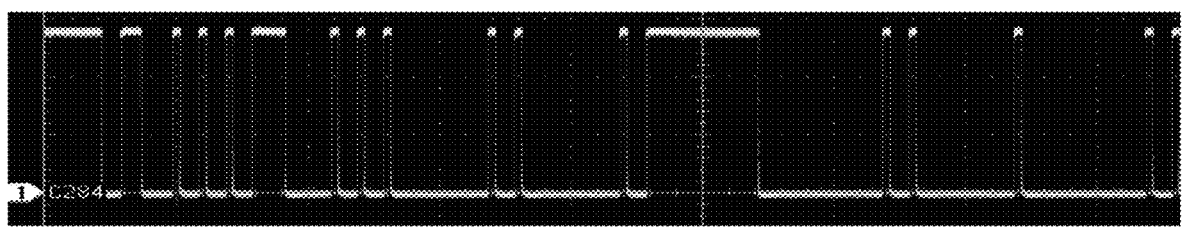

The comparator 710-4 compares the output signal of the filter 710-3 to a reference signal. An output signal of the comparator 710-4 is output to the reception port 740 of the controller 120-1-3. An example of a signal waveform at the reception port 740 is illustrated in FIG. 8C. In other words, an example of the IR signal processed by the transceiver 120-1-1 is illustrated in FIG. 8C.

The reference signal is, for example, a voltage signal of 3.3 V. However, the reference is not limited to this example.

In response to the output signal of the comparator 710-4 being received, the controller 120-1-3 changes the state of the transceiver 120-1-1 to a transmission state by setting the SELECT pin to "0".

Figure 9A:
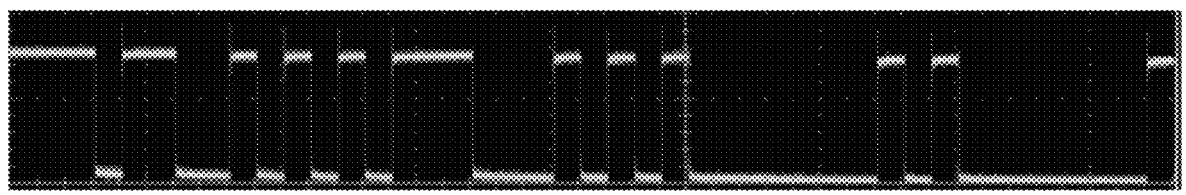

To transmit data, for example, the sensing data of the battery 210-1, to the master battery management apparatus 110, the controller 120-1-3 transmits the corresponding data to the transceiver 120-1-1 through a transmission port 750. An example of a signal waveform corresponding to the data at the transmission port 750 is illustrated in FIG. 9A.

The modulator 710-5 receives a carrier signal through the MCO port of the controller 120-1-3.

Figure 9B:
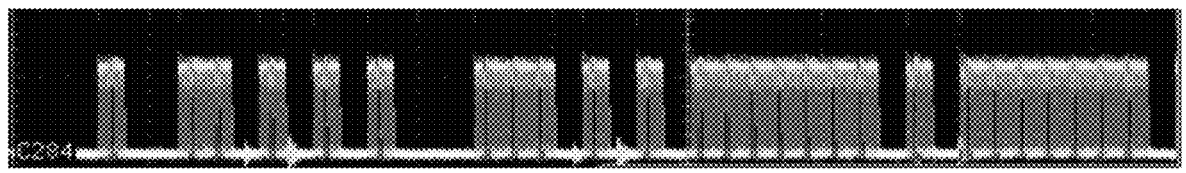

The modulator 710-5 modulates the data received from the controller 120-1-3 based on the carrier signal. The modulated data is transmitted to the IR LED 710-1 via a node 760. An example of a signal waveform at the node 760 is illustrated in FIG. 9B. In other words, an example of a waveform of an electrical signal corresponding to the modulated data is illustrated in FIG. 9B.

The IR LED 710-1 outputs the modulated data using an IR signal. In other words, the IR LED 710-1 outputs the IR signal based on the signal waveform illustrated in FIG. 9B. Thus, the transceiver 120-1-1 transmits the data of the controller 120-1-3 to the master battery management apparatus 110 through IR communication.

The schematic design of the transceiver 120-1-1 described with reference to FIG. 7 also applies to the transceiver 120-1-2, the transceivers included in the other slave battery management apparatuses 120-2 through 120-n, and the transceiver 220-2 in the master battery management apparatus 110.

As another example, the transceiver described with reference to FIGS. 1 through 5 includes a plurality of IR LEDs, an LED multiplexer (MUX), a modulator, and a receiver. In this example, the modulator includes an AND gate and an inverter, and the receiver includes a filter, a trigger circuit, and an inverter. Such an example of the transceiver will be described below with reference to FIG. 10.

Figure 10:
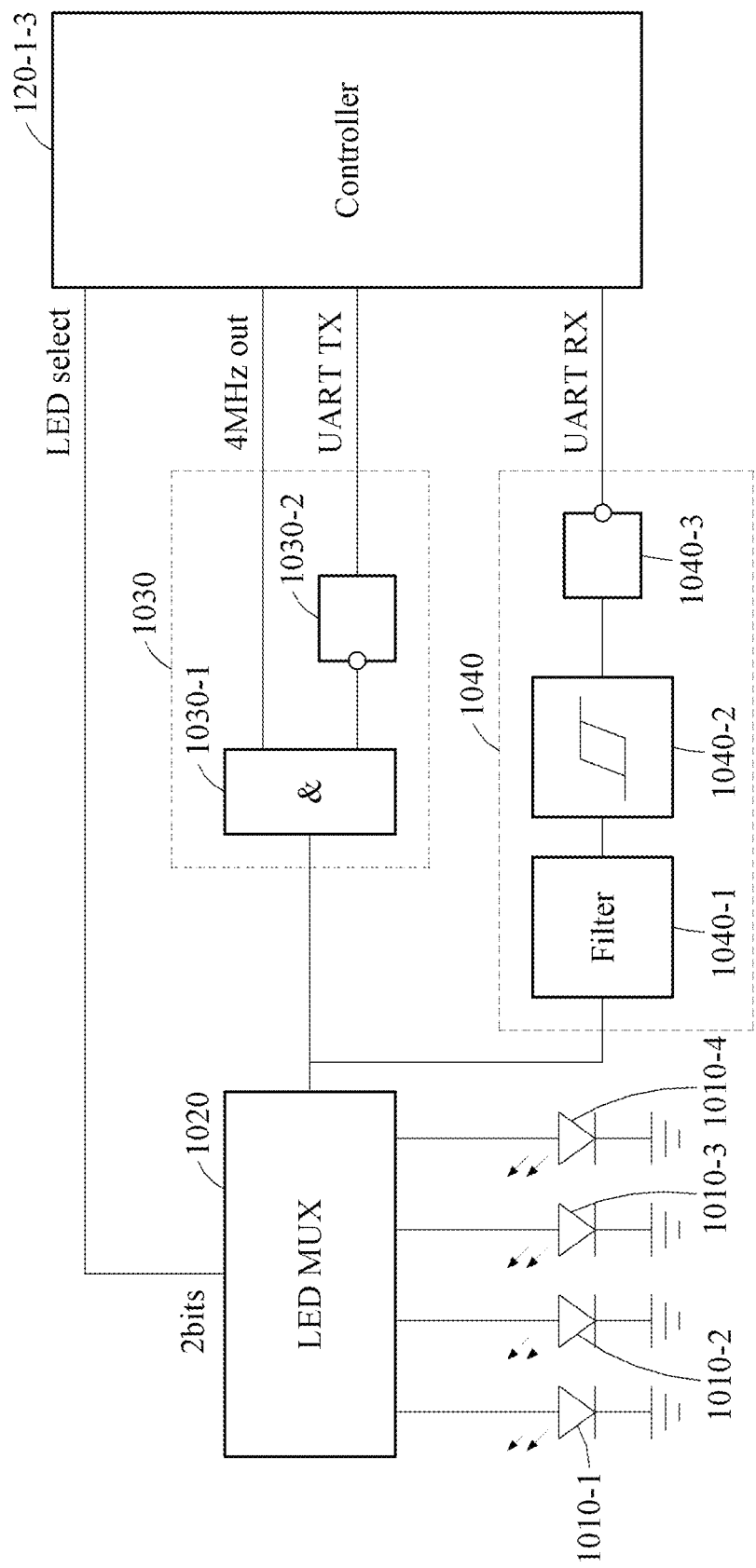
FIG. 10 illustrates an example of a transceiver.

Referring to FIG. 10, the transceiver 120-1-1 includes a plurality of IR LEDs 1010-1 through 1010-4, an LED MUX 1020, a modulator 1030, and a receiver 1040.

In FIG. 10, the slave battery management apparatus 120-1 is in a listen mode. In this example, the controller 120-1-3 sequentially polls the plurality of IR LEDs 1010-1 through 1010-4 using the LED MUX 1020.

In response to a transmission sequence being determined by one of the plurality of IR LEDs 1010-1 through 1010-4, the controller 120-1-3 stops polling and continuously listens to a selected channel. Data received through the selected channel is transmitted to the receiver 1040. The receiver 1040 processes the received data and transmits a result of the processing to the controller 120-1-3.

The controller 120-1-3 identifies an IR LED sensing an IR signal by sequentially polling the plurality of IR LEDs 1010-1 through 1010-4. In the example of FIG. 10, it is assumed that the IR LED 1010-1 senses the IR signal. In this example, the controller 120-1-3 stops polling and continuously listens to a selected channel, that is, the IR LED 1010-1. The data received through the IR LED 1010-1 is transmitted to a filter 1040-1 in the receiver 1040. The filter 1040-1 is, for example, a 1-MHz filter. However, the filter 1040-1 is not limited to a 1-MHz filter. The filter 1040-1 filters the received data. A trigger circuit 1040-2 triggers an output signal of the filter 1040-1. An inverter 1040-3 inverts an output signal of the trigger circuit 1040-2. The inverter 1040-3 corresponds to a NOT gate. However, the inverter 1040-3 is not limited to a NOT gate. An output signal of the inverter 1040-3 is transmitted to the controller 120-1-3.

The controller 120-1-3 selects a channel suitable for transmitting the data. For example, the controller 120-1-3 selects one or more IR LEDs from among the plurality of IR LEDs 1010-1 through 1010-4 to transmit the data. An inverter 1030-2 in the modulator 1030 inverts the data received from the controller 120-1-3. The inverter 1030-2 corresponds to a NOT gate. However, examples are not limited thereto. The modulator 1030 performs modulation based on the inverted data, the carrier signal received from the controller 120-1-3 and an AND gate 1030-1. The carrier frequency is, for example, 4 MHz. However, the carrier frequency is not limited to 4 MHz. An output signal of the modulator 1030 is transmitted to the LED MUX 1020. The LED MUX 1020 transmits the output signal of the modulator 1030 to the one or more IR LEDs selected by the controller 120-1-3. The one or more IR LEDs selected by the controller 120-1-3 outputs the output signal of the modulator 1030 using an IR signal.

The example of the transceiver 120-1-1 described with reference to FIG. 10 also applies to the transceiver 120-1-2, the transceivers included in the other slave battery management apparatuses 120-2 through 120-n, and the transceiver 220-2 in the master battery management apparatus 110.

FIG. 11 illustrates an example of an operating method of a battery management apparatus.

A battery management apparatus of FIG. 11 corresponds to the slave battery management apparatus 120-1 described above. The battery management apparatus set forth hereinafter through FIG. 11 also applies to the other slave battery management apparatuses 120-2 through 120-n.

Referring to FIG. 11, in operation 1110, the battery management apparatus receives a first IR signal output from a neighbor battery management apparatus. For example, the slave battery management apparatus 120-1 receives an IR signal from the master battery management apparatus 110 using the transceiver 120-1-1. The slave battery management apparatus 120-1 also receives an IR signal from the slave battery management apparatus 120-2 using the transceiver 120-1-2.

In operation 1120, the battery management apparatus processes the first IR signal. In operation 1130, the battery management apparatus extracts information from the processed first IR signal. The information includes, for example, the command, the request, or the result of the operation corresponding to the command described above. For example, the slave battery management apparatus 120-1 performs filtering on the IR signal of the master battery management apparatus 110, amplifies a filtering result, compares an amplification result to a reference signal, and extracts the command of the master battery management apparatus 110 from a corresponding comparing result. In this example, the slave battery management apparatus 120-1 separates its command from a command for at least one of the other slave battery management apparatuses 120-2 through 120-n, and relays the command for at least one of the other slave battery management apparatuses 120-2 through 120-n using the transceiver 120-1-2. The slave battery management apparatus 120-1 also performs filtering on the IR signal of the slave battery management apparatus 120-2, amplifies a filtering result, compares an amplification result to a reference signal, and extracts data transmitted by the slave battery management apparatus 120-2 from a corresponding comparing result. The slave battery management apparatus 120-1 stores the extracted data in a buffer.

In operation 1140, the battery management apparatus outputs a second IR signal based on the extracted information. For example, the slave battery management apparatus 120-1 transmits the extracted command of the master battery management apparatus 110 to the slave battery management apparatus 120-1 using the transceiver 120-1-2 through an IR signal. The slave battery management apparatus 120-1 also transmits the data extracted from the IR signal of the slave battery management apparatus 120-2 to the master battery management apparatus 110 using the transceiver 120-1-1.

The description provided with reference to FIGS. 1 through 10 also applies to the description of FIG. 11, and thus a duplicated description will be omitted for conciseness.

The controller 220-1, the controllers 120-1-3 through 120-$n$-3, and the balancers 120-1-5 through 120-$n$-5 in FIGS. 2, 6, and 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4A, 4B, and 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery management apparatus, comprising:
a first transceiver configured to receive a first infrared (IR) signal output from a neighbor battery management apparatus, generate an electrical signal based on the first IR signal, amplify the electrical signal, filter the amplified electrical signal, and generate a first signal by comparing the filtered electrical signal to a reference signal;
a controller configured to receive the first signal from the first transceiver, extract information from the first signal, and sense a battery using a sensor according to the extracted information; and
a second transceiver configured to generate a second IR signal based on the extracted information and output the second IR signal.

2. The battery management apparatus of claim 1, wherein the controller is further configured to change a state of the first transceiver to a transmission state, in response to the first transceiver receiving the first IR signal.

3. The battery management apparatus of claim 2, wherein the first transceiver is further configured to transmit, in the transmission state, a response to the first IR signal to the neighbor battery management apparatus.

4. The battery management apparatus of claim 1, wherein the controller is further configured to change a state of the second transceiver to a reception state, in response to the second transceiver outputting the second IR signal.

5. The battery management apparatus of claim 1, wherein the controller is further configured to transmit a result of an operation of another neighbor battery management apparatus to the neighbor battery management apparatus through the first transceiver, in response to the second transceiver receiving the result of the operation from the other neighbor battery management apparatus.

6. The battery management apparatus of claim 1, wherein the first transceiver is further configured to generate an electrical signal by receiving the first IR signal, amplify the electrical signal, filter the amplified electrical signal, compare a result of the filtering to a reference electrical signal, and output a result of the comparing to the controller.

7. The battery management apparatus of claim 1, wherein the second transceiver is further configured to modulate the extracted information based on a carrier signal.

8. The battery management apparatus of claim 1, wherein the first transceiver comprise:
an IR light emitting diode (LED) configured to receive the first IR signal and generate the electrical signal;
an amplifier configured to amplify the electrical signal;
a filter configured to filter the amplified electrical signal;
a comparator configured to generate the first signal by comparing the filtered electrical signal to the reference signal;
a modulator configured to receive information from the controller and modulate the received information; and
a switch configured to switch between the IR LED and the modulator based on a control of the controller.

9. A battery management system, comprising:
slave battery management apparatuses; and
a master battery management apparatus configured to control the slave battery management apparatuses,
wherein the slave battery management apparatuses each comprise:
a first transceiver configured to receive a first infrared (IR) signal output from a neighbor battery management apparatus, generate an electrical signal based on the first IR signal, amplify the electrical signal, filter the amplified electrical signal, and generate a first signal by comparing the filtered electrical signal to a reference signal;
a controller configured to receive the first signal from the first transceiver, extract information from the first signal, and sense a battery using a sensor according to the extracted information; and
a second transceiver configured to generate a second IR signal based on the extracted information and output the second IR signal.

10. The battery management system of claim 9, wherein the controller is further configured to change a state of the first transceiver to a transmission state, in response to the first transceiver receiving the first IR signal.

11. The battery management system of claim 10, wherein the first transceiver is further configured to transmit, in the transmission state, a response to the first IR signal to the neighbor battery management apparatus.

12. The battery management system of claim 9, wherein the controller is further configured to change a state of the second transceiver to a reception state, in response to the second transceiver outputting the second IR signal.

13. The battery management system of claim 9, wherein the controller is further configured to transmit a result of an operation of another neighbor battery management apparatus to the neighbor battery management apparatus through the first transceiver, in response to the second transceiver receiving the result of the operation from the other neighbor battery management apparatus.

14. The battery management system of claim 9, wherein the first transceiver is further configured to generate an electrical signal by receiving the first IR signal, amplify the electrical signal, filter the amplified electrical signal, compare a result of the filtering to a reference electrical signal, and output a result of the comparing to the controller.

15. The battery management system of claim 9, wherein the second transceiver is further configured to modulate the extracted information based on a carrier signal.

16. The battery management system of claim 9, wherein the first transceiver comprise:
an IR light emitting diode (LED) configured to receive the first IR signal and generate the electrical signal;
an amplifier configured to amplify the electrical signal;
a filter configured to filter the amplified electrical signal;
a comparator configured to generate the first signal by comparing the filtered electrical signal to the reference signal;
a modulator configured to receive information from the controller and modulate the received information; and a switch configured to switch between the IR LED and the modulator based on a control of the controller.

17. An operating method of a battery management apparatus, the operating method comprising:
- receiving a first infrared (IR) signal output from a neighbor battery management apparatus;
- generating an electrical signal based on the first IR signal;
- amplifying the electrical signal;
- filtering the amplified electrical signal;
- generating a first signal by comparing the filtered electrical signal to a reference signal;
- extracting information from the first signal;
- sensing a battery using a sensor according to the extracted information;
- generating a second IR signal based on the extracted information; and
- outputting the second IR signal.

18. The operating method of claim 17, further comprising transmitting a response to the first IR signal to the neighbor battery management apparatus.

* * * * *